United States Patent
Giombanco

(10) Patent No.: US 11,641,162 B2
(45) Date of Patent: May 2, 2023

(54) CIRCUITS AND METHODS FOR GENERATING A SUPPLY VOLTAGE FOR A SWITCHING REGULATOR

(71) Applicant: Texas Instruments Incorporated, Dallas, TX (US)

(72) Inventor: Salvatore Giombanco, Cassaro (IT)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 1491 days.

(21) Appl. No.: 13/859,286

(22) Filed: Apr. 9, 2013

(65) Prior Publication Data

US 2014/0300338 A1 Oct. 9, 2014

(51) Int. Cl.
*H02M 3/335* (2006.01)
*H02M 1/00* (2006.01)

(52) U.S. Cl.
CPC ... *H02M 3/33507* (2013.01); *H02M 3/33576* (2013.01); *H02M 1/0006* (2021.05)

(58) Field of Classification Search
CPC ......... H02M 3/33507; H02M 3/33576; H02M 2001/0006; H02M 3/145; H02M 3/335017; H02M 3/335; H02M 3/33515; H02M 3/33523; H02M 3/3353; H02M 3/22; H02M 3/24; H02M 3/315; H02M 3/3353; H02M 3/33538; H02M 3/33546; H02M 3/33553; H02M 3/33592; H02M 1/0006; H02M 1/08; H02M 1/36
USPC ............. 323/287, 222–226, 266, 271–275, 323/282–285, 289, 351; 363/15–21.18, 363/89
See application file for complete search history.

(56) References Cited

U.S. PATENT DOCUMENTS

| | | | | |
|---|---|---|---|---|
| 7,443,147 B2 * | 10/2008 | Kasai et al. | ................... | 323/259 |
| 7,724,065 B2 * | 5/2010 | Bayerer | ............... | H03K 17/107 |
| | | | | 326/82 |
| 2006/0171179 A1 * | 8/2006 | Hall | ...................... | H02M 3/156 |
| | | | | 363/95 |
| 2007/0070659 A1 * | 3/2007 | Sawtell | ............. | H02M 3/33523 |
| | | | | 363/21.01 |
| 2009/0257254 A1 * | 10/2009 | Leu | ................................. | 363/40 |
| 2010/0039083 A1 * | 2/2010 | Moriarty, Jr. | ......... | H02M 5/293 |
| | | | | 323/282 |
| 2010/0117617 A1 * | 5/2010 | Chuang | ............. | H02M 3/33507 |
| | | | | 323/285 |

(Continued)

OTHER PUBLICATIONS

"Design of a Low-Input-Voltage Converter for Thermoelectric Generator" John M. Damaschke, IEEE Sep./Oct. 1997.*

*Primary Examiner* — Thienvu V Tran
*Assistant Examiner* — Carlos O Rivera-Perez
(74) *Attorney, Agent, or Firm* — Frank D. Cimino

(57) ABSTRACT

Circuits and methods for converting a current to an output voltage are disclosed herein. An embodiment of the circuit includes a first switch connected between a source of current and a first node and a second switch connected between the first node and a common voltage. The circuit also includes a first controller for controlling the state of the first switch and a second controller for controlling the state of the second switch. A capacitor is coupled to the first node; the voltage on the capacitor is the output voltage. When the second switch is open, the capacitor charges, and when the second switch is closed, the capacitor does not charge. The current flows through the primary inductance of a transformer.

27 Claims, 4 Drawing Sheets

(56) References Cited

U.S. PATENT DOCUMENTS

| | | | |
|---|---|---|---|
| 2010/0141326 A1* | 6/2010 | Tumminaro | H03K 17/163 327/374 |
| 2011/0157919 A1* | 6/2011 | Yedevelly et al. | 363/20 |
| 2011/0199802 A1* | 8/2011 | Leu | 363/131 |
| 2011/0260543 A1* | 10/2011 | Rizet | H02M 1/34 307/66 |
| 2012/0200275 A1* | 8/2012 | Ribarich | H02M 1/36 323/282 |
| 2013/0077353 A1* | 3/2013 | Kuang | H02M 3/33507 363/20 |
| 2013/0107593 A1* | 5/2013 | Fisch | H02M 7/217 363/89 |
| 2013/0194026 A1* | 8/2013 | Ivankovic | H03K 17/74 327/427 |
| 2014/0028356 A1* | 1/2014 | Knoedgen | H02M 1/32 327/108 |
| 2014/0152237 A1* | 6/2014 | Yan | H02J 7/045 320/107 |
| 2014/0185343 A1* | 7/2014 | Kim | H02M 3/33507 363/89 |

* cited by examiner

CIRCUITS AND METHODS FOR GENERATING A SUPPLY VOLTAGE FOR A SWITCHING REGULATOR

BACKGROUND

In some integrated circuits, such as pulse width modulation controllers, internal power supplies are preferred. The internal power supply is sometimes referred to as a self-supply. The internal power supply generates power to operate the circuits and components within the integrated circuits and may be a voltage converter or a plurality of voltage converters that convert a voltage to at least one voltage used by the integrated circuit.

Some integrated circuits are used to control a flyback converters or the like. For example, the integrated circuits may control flyback converters used in pulse width modulation controllers. The flyback converters are not presently suitable as a source for an internal power supply. Flyback converters and similar circuits have a high voltage component, such as a switch supplying a current source that is connected either to a DC bulk high voltage node or to a high voltage drain switching node. The high voltage component has to source an average current equal to the power consumption in the integrated circuit and has a voltage drop almost equal to the DC bulk high voltage.

The amount of power dissipation for the high voltage component is a problem when it is internal to the integrated circuit. In some embodiments, the power dissipation is the sum of the power dissipation of the high voltage component and a high voltage MOSFET that may be used for power generation within the integrated circuit. In order to reduce the power dissipated by the MOSFET, the on resistance of the MOSFET could be reduced. Alternatively, a larger integrated circuit package with a low thermal resistance could be used. Both solutions increase the cost of the integrated circuit.

SUMMARY

Circuits and methods for converting a current to an output voltage are disclosed herein. An embodiment of the circuit includes a first switch connected between a source of current and a first node and a second switch connected between the first node and a common voltage. The circuit also includes a first controller for controlling the state of the first switch and a second controller for controlling the state of the second switch. A capacitor is coupled to the first node; the voltage on the capacitor is the output voltage. When the second switch is open, the capacitor charges, and when the second switch is closed, the capacitor does not charge. The current flows through the primary inductance of a transformer.

DETAILED DESCRIPTION

Circuits and methods for providing an internal power supply or self-supply are described herein. The circuits and methods described herein are related to pulse width modulation (PWM) control circuits and are used herein for illustration purposes. It is to be noted that the circuits and methods described herein may be applied to circuits other than pulse width modulation circuits.

Figure 1:
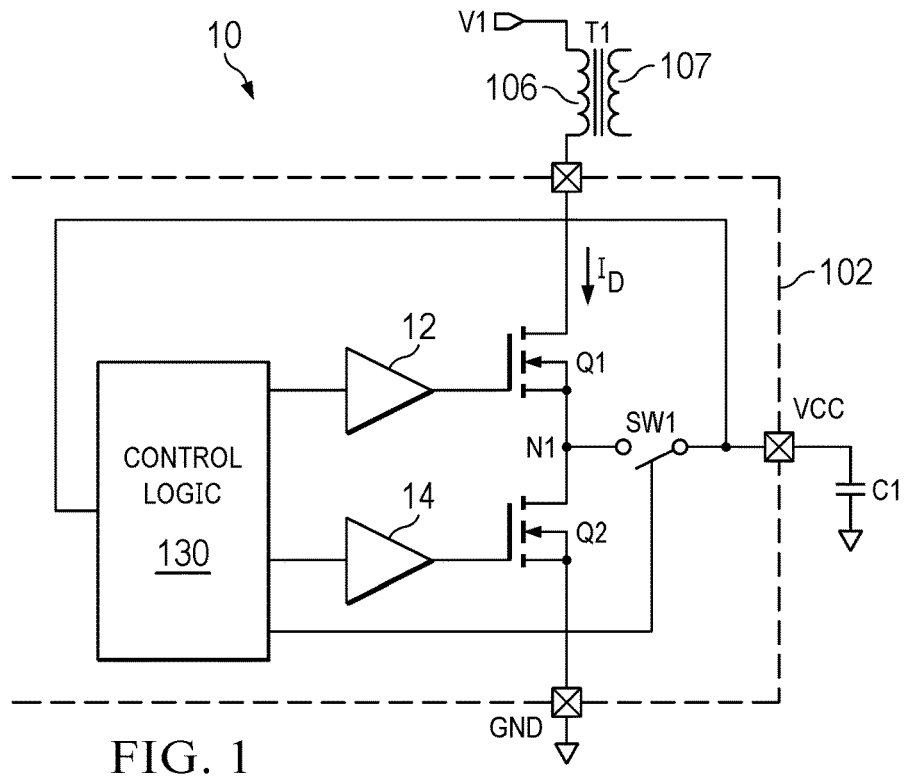
FIG. 1 is a schematic diagram of a circuit for providing internal power for an integrated circuit.

Reference is made to FIG. 1, which is a schematic illustration of a circuit 10 for generating an output voltage, VCC. The voltage VCC is used as a self-supply voltage for the circuit 10. The circuit 10 may be located within an integrated circuit 102, wherein the voltage VCC is used to power the integrated circuit 102. The integrated circuit 102 may include a pulse width modulation (PWM) controller, not shown, that controls a flyback transformer T1. The transformer T1 may be external to the integrated circuit 102. The transformer T1 has a primary side 106 and a secondary side 107. The primary side 106 of the transformer T1 is connected to a voltage source V1, which may be a high voltage source. The primary side 106 of the transformer T1 is sometimes referred to as the primary winding magnetization inductance or the primary inductance. The secondary side 107 of the transformer T1 may be connected to components, such as light-emitting diodes or generic loads that are controlled by use of PWM. The integrated circuit 102 controls the PWM, which controls the power delivered to the loads connected to the secondary side 107 of the transformer T1.

The circuit 10 includes a first switch Q1 and a second switch Q2 that are connected in series at a node N1. In the embodiment of FIG. 1, the switches Q1, Q2 are metal oxide semiconductor field effect transistors (MOSFETs) and may be referred to as the FET Q1 and the FET Q2. It is noted devices other than the MOSFETs, such as other types of transistors, may be used for the switches Q1 and Q2. The drain of the FET Q1 is connected to the primary side 106 of the transformer T1. The source of the FET Q1 is connected to the drain of the FET Q2 at the node N1. The source of the FET Q2 is connected to ground. The configuration of the FET Q1 is used as a switched bootstrap cascode with the FET Q2. The current flow in the FET Q1 is sometimes referred to as the drain current $I_D$.

The node N1 is also connected to a switch SW1. The circuit 10 uses the switch SW1 to allow current to flow in one direction as described below. The other side of the switch SW1 is connected to a capacitor C1, which is connected to ground. The voltage across the capacitor C1 is the output voltage VCC. The switch SW1, which is at the potential of the output voltage, is connected to control logic 130, which can monitor the voltage VCC. The circuit 10 also includes two drivers, which are referred to as a first driver 12 and a second driver 14. Both drivers 12, 14 receive input signals from the control logic 130. The output of the first driver 12 is connected to the gate of the FET Q1 and the output of the second driver 14 is connected to the gate of the FET Q2. The control logic 130 controls the gate voltages and currents through the FETs Q1 and Q2 in addition to the state of the switch SW1. Therefore, the control logic 130 can monitor and set the output voltage VCC by switching the states of the FETs Q1 and Q2.

Having described the circuit 10, its operation will now be described. In summary, the FET Q1 is used to charge the capacitor C1, wherein the voltage on the capacitor C1 is the output voltage VCC. The FET Q1 is used as a switched bootstrap cascode with the FET Q2. By selectively turning on and turning off the FETs Q1 and Q2 the primary winding magnetization inductance of the transformer T1 can be charged along with the capacitor C1. The drivers 12 and 14 control the current flow through the FETs Q1 and Q2 so as to control the charging of the capacitor C1.

The operation of the circuit 10 will now be described in more detail. The FETs Q1 and Q2 have internal capacitance between their gates and sources. When the FETs Q1 and Q2 are on, their gate-to-source capacitances are charged to the VCC voltage. In addition, the current in the FET Q1, referred to as the drain current $I_D$, charges the primary side 106 of the transformer T1, which is also referred to as the primary inductance. As the drain current $I_D$ reaches a peak threshold established by the control law of the circuit 10 as a function of a load connected to secondary side 107 of the transformer T1, the FET Q2 is turned off while the FET Q1 is on. In this configuration, the gate-to-source capacitance, which was previously charged to VCC voltage, is shifted upwards. Therefore, the source voltage of the FET Q1 is clamped to VCC and the drain current $I_D$ is switched to charge the capacitor C1 by way of closing the switch SW1.

Because the FET Q1 is still on, the drain voltage is low, so the voltage from the source V1 drops across the primary side 106 of the transformer T1. Therefore, the capacitor C1 is charged without any additional power dissipation from the source V1, which significantly improves the efficiency for generating the voltage VCC. The drain current $I_D$ charges the capacitor C1 for a time window when the FET Q2 is turned off. Then, the FET Q2 is turned on again and the source voltage of the FET Q1 goes low again. At this point the FET Q1 is turned off to control the slope of the drain voltage through the gate current by means of the first driver 12, or the current output by the first driver 12, which improves the electromagnetic interference (EMI) performance of the circuit 100. Therefore, the circuit 10 provides for drain slope control to reduce EMI in addition to providing self supply for the integrated circuit 102.

Figure 2A:
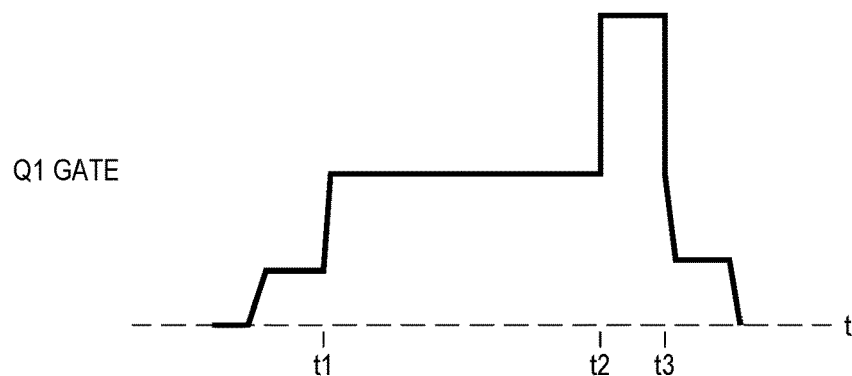
FIGS. 2A-2F are graphs showing voltages and currents at different locations in the circuit of FIG. 1.
Figure 2B:
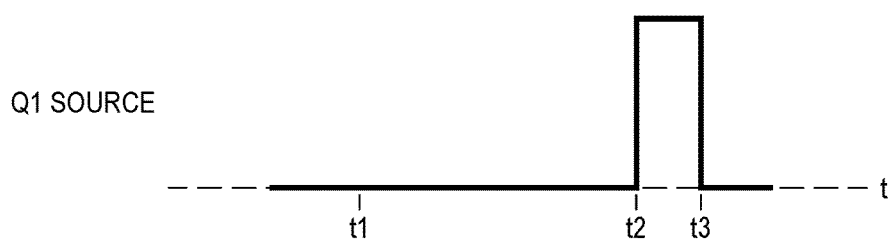
Figure 2C:
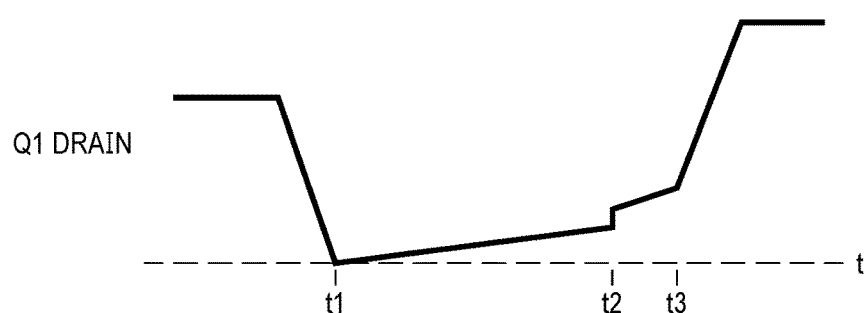
Figure 2D:
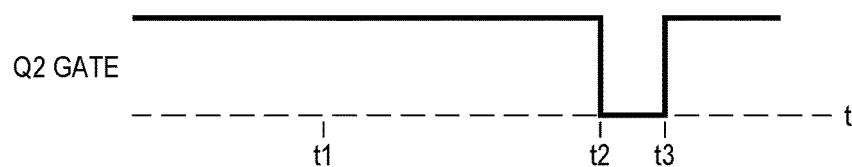
Figure 2E:
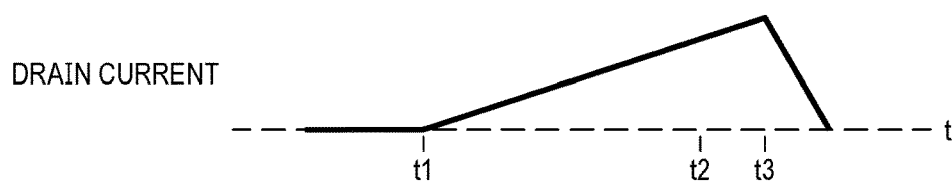
Figure 2F:

A more detailed operation of the circuit 10 is provided below with reference to FIGS. 2A-2F, which are graphs showing voltages at different nodes within the circuit 10. Three modes of operation of the circuit 10 will be described, a turn-on transient mode, a self-supply mode, and a turn-off transient mode. The three modes are part of a cycle that the circuit 10 uses during its operation. The graphs 2A-2F have three times noted, t1, t2, and t3. The time t1 is the beginning of the turn-on transient mode, t2 is the beginning of the self-supply mode, and t3 is the beginning of the turn-off transient mode. FIG. 2A shows the voltage on the gate of the FET Q1. FIG. 2B shows the voltage on the source of the FET Q1. FIG. 2C shows the drain voltage on the FET Q1, FIG. 2D shows the voltage on the gate of the FET Q2. FIG. 2E shows the drain current $I_D$. FIG. 2F shows the current through the capacitor C1.

During the turn-on transient mode (sometimes referred to as the first mode), which occurs at time t1, the FET Q2 is on and the FET Q1 is turned on as shown by the graphs of FIGS. 2A and 2D. More specifically, the high voltage on the gates indicates that the FETs Q1 and Q2 are on. Therefore, the drain voltage slope, as shown by the graph of FIG. 2C, is controlled by the first driver 12. Controlling the drain voltage slope reduces the EMI of the circuit 10 by attenuating transients. The first driver 12 forces a current through the gate and to the source of the FET Q1. The current continues through the FET Q2 to ground. During on the turn-on transient mode, from time t1 to time t2, the slope of the drain current depends on the voltage output by the voltage source V1 and the primary inductance of the transformer T1. The slope of the drain current may be equal or proportional to the ratio of the voltage of the source V1 and the inductance of the primary side 106 of the transformer T1.

During the self-supply mode (sometimes referred to as the second mode), which occurs at time t2, the FET Q2 is turned off, as shown in FIG. 2D. The gate-source capacitance in the FET Q1 acts as a bootstrap that allows the gate voltage on the FET Q1 to reach a value that is greater than the voltage VCC. The voltage between t2 and t3 on FIG. 2A is greater than VCC. For example, the gate voltage may rise to twice the voltage VCC. Because the FET Q2 is off, the drain current $I_D$ passes through the capacitor C1, which charges the capacitor C1 as shown in FIG. 2F. The source voltage on the FET Q1 is clamped to VCC. It follows that the gate-source voltage of the FET Q1 is equal to VCC.

During the turn-off transient mode (sometimes referred to as the third mode), which occurs at t3, the FET Q2 is turned on as shown in FIG. 2D. This causes the gate-source capacitance voltage on the FET Q1 to be shifted toward ground as shown in FIG. 2B. Then the FET Q1 is turned off, and in this situation, the slope of the drain voltage across the FET Q1 is controlled by the first driver 12. The result is the decreasing drain current $I_D$ shown in FIG. 2E.

The circuit 10 provides the voltage VCC and power for the integrated circuit 102 by using the current driving the primary side 106 of the transformer T1. By using the driving current, no bias winding is required from the transformer T1. It is noted that while the primary side 106 of the transformer T1 has been described as the source of current or part of the source of current for the circuit 10, other sources of current could be used. In addition, the generation of the voltage VCC does not require any additional power dissipation from the voltage source V1 that supplies the transformer T1. A further advantage to the circuit 10 is that the drain slope can be controlled during the switching transients as shown by the graph in FIG. 2E. Therefore, EMI can be attenuated during the switching between operating modes of the circuit 10.

The circuit 10 of FIG. 1 shows the use of the first and second drivers 12 and 14 to control the drain current $I_D$ and the charging of the capacitor C1. The charge on the capacitor C1 is the output voltage VCC. A more discrete version of the circuit 10 is shown by the circuit 100 of FIG. 3. The circuit 100 includes the FET Q1 and the FET Q2. The node N1 is connected to the anode of a diode D1. The circuit 100 uses the diode D1 as a switch, similar to the manner in which the switch SW1 of FIG. 1 is used, to enable current to flow in one direction. The cathode of the diode D1 is connected to the capacitor C1. The cathode of the diode D1 is connected to a first current source I1, which, as described below, is used to control the slope of the drain voltage of the FET Q1 during the turn on and turn off transients. The first current source I1 is connected to a switch SW3, which is connected to a node N2. The node N2 connects to the gate of the FET Q1 and to a switch SW4. The switch SW4 is connected to a second current source I2, which is connected to ground.

The gate of the FET Q2 is connected to the control logic 130 by way of the second driver 14. The control logic 130 may also control the state of the switches SW3 and SW4. The combination of the current sources I1 and I2 and the combination of the switches SW3 and SW4 constitute one possible embodiment of the first driver 12, FIG. 1, in discrete form. In addition to the components described above, the circuit 100 may include voltage measuring devices to measure voltages at specific locations in the circuit 100, including the voltage VCC.

Having described an embodiment of the circuit 100, other embodiments using discrete or integrated components will now be described. Reference is made to FIG. 4, which shows an alternative embodiment of the circuit 100 of FIG. 3. The diode D1 of FIG. 3 has been replaced by the switch SW1 that is controlled by the control logic 130. During the self-supply mode, the control logic 130 closes the switch SW1 so that the capacitor C1 can charge. In some embodiments, the switch SW1 is closed when the source voltage of the FET Q2 reaches the VCC voltage. During the turn-off transient mode, the switch SW1 is opened in order to prevent the capacitor C1 from discharging within the circuit 100.

Figure 3:
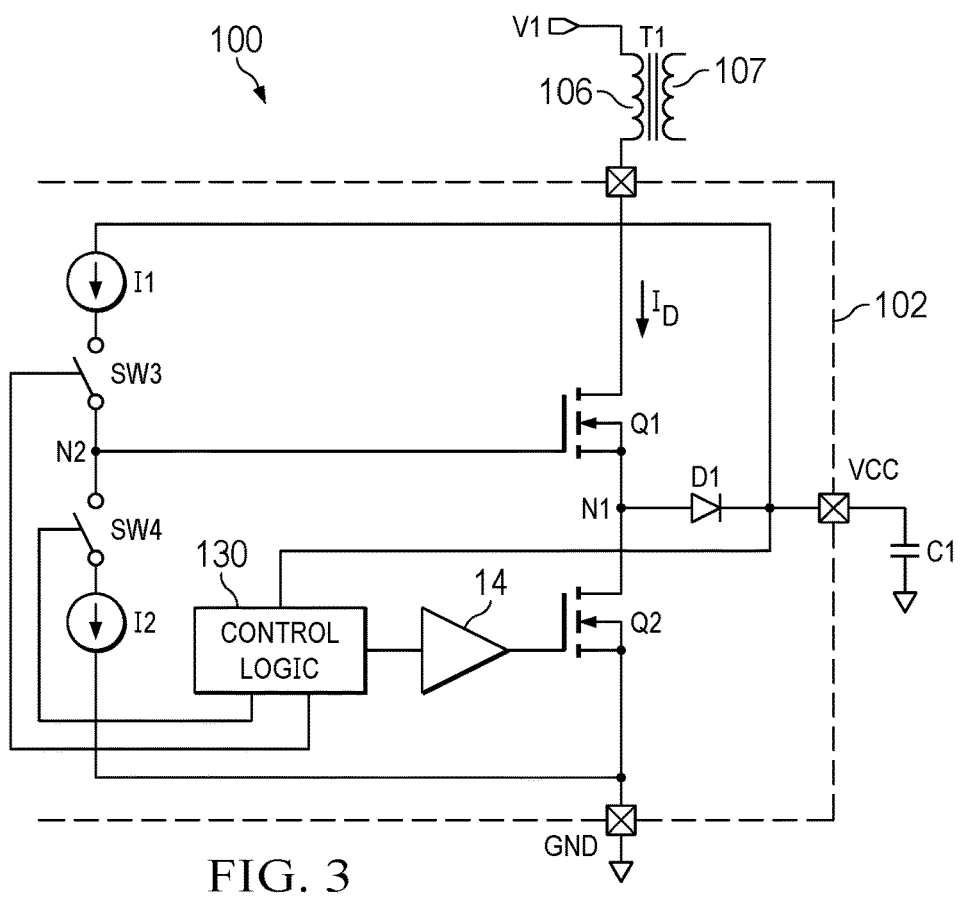
FIG. 3 is an alternate embodiment of the circuit of FIG. 1.
Figure 4:
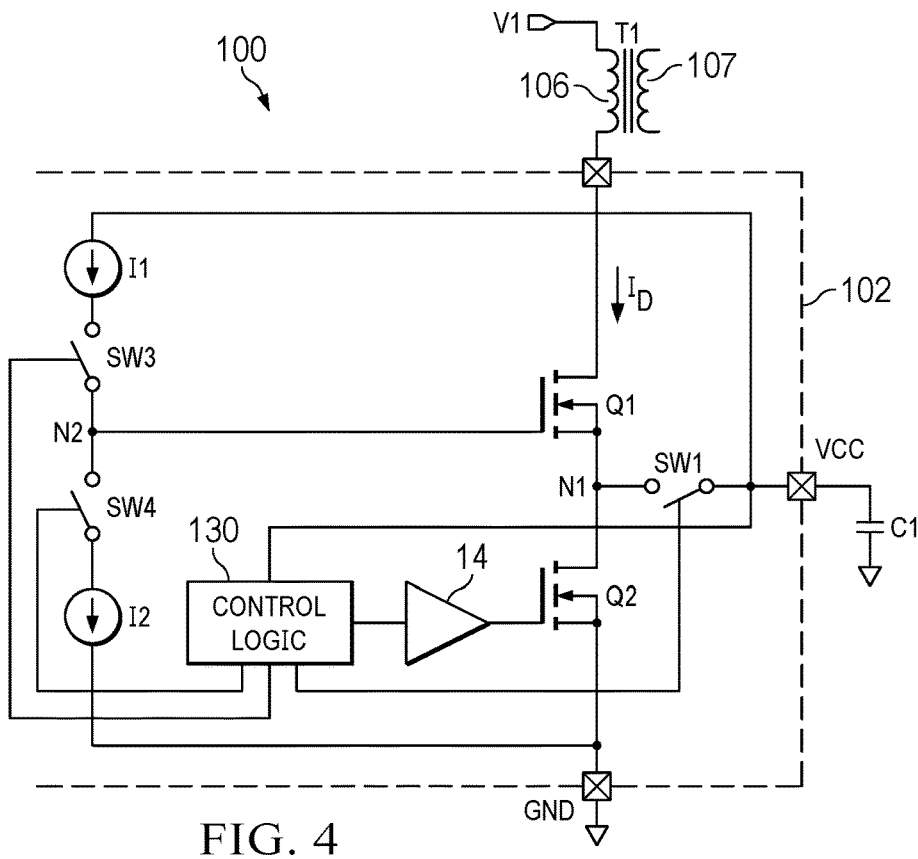
FIG. 4 is an alternate embodiment of the circuit of FIG. 1.
Figure 5:
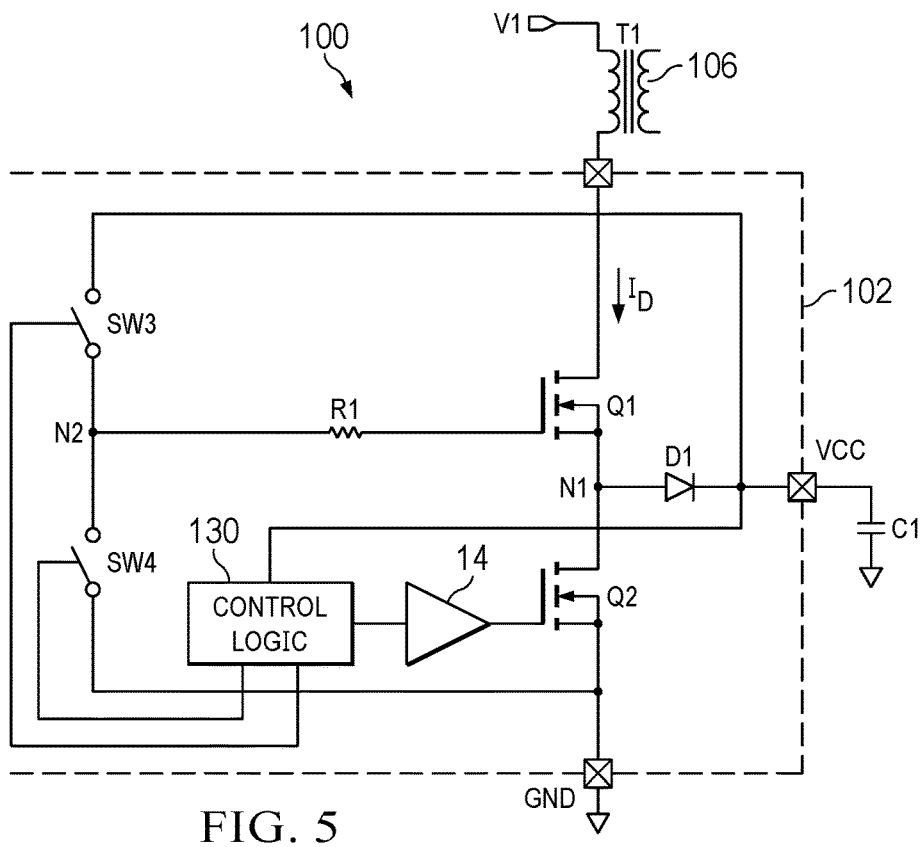
FIG. 5 is an alternate embodiment of the circuit of FIG. 1.

FIG. 5 is an embodiment of the circuit 100 of FIG. 3 wherein the current sources I1 and I2 have been replaced by a resistor R1. The resistor R1 is located between the node N2 and the gate of the FET Q1. During the turn-on transient mode, the switch SW3 is closed, so the drain slope is controlled by the value of the resistor R1. More specifically, the current through the gate of the FET Q1 is controlled by the value of the resistor R1, which controls the slope of the drain voltage during switching transients. Accordingly, the resistor R1 acts as a current control or source. During the turn-off transient mode, the switch SW4 is closed, so the drain slope is again controlled by the value of the resistor R1. It is noted that resistors could be placed in series with the switches SW3 and SW4 in order to provide more flexibility in controlling the drain slope during the transient modes.

Figure 6:
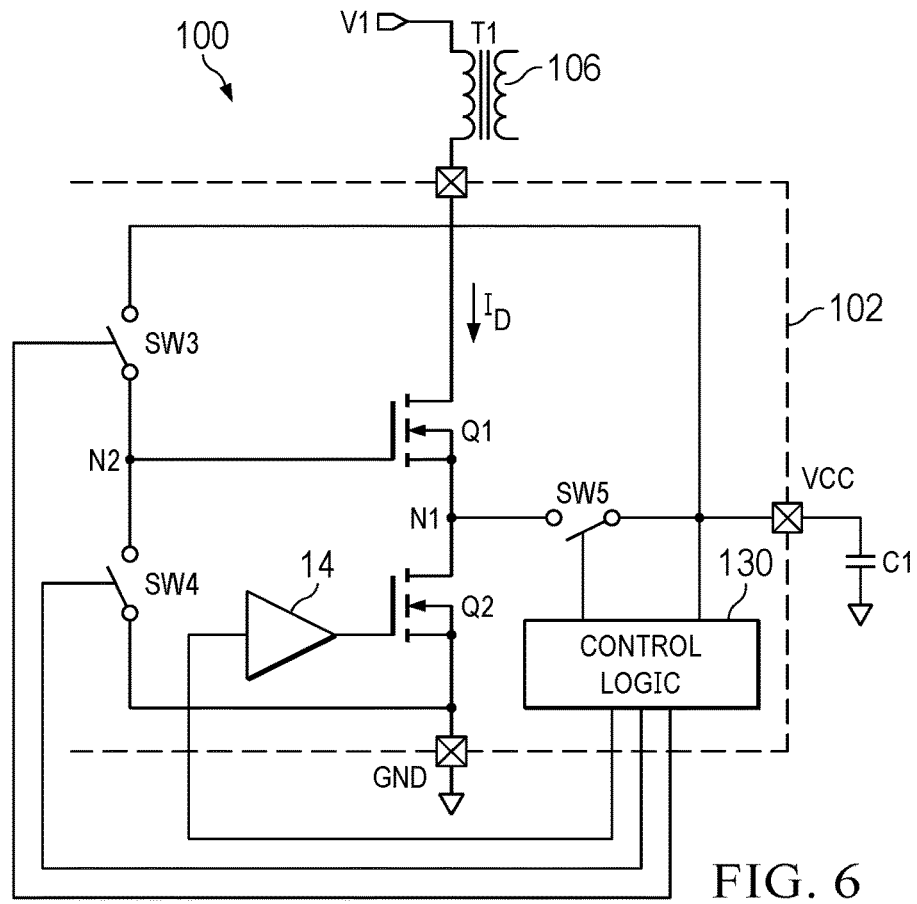
FIG. 6 is an alternate embodiment of the circuit of FIG. 1.

Another embodiment of the circuit 100 of FIG. 3 is shown in FIG. 6. The circuit 100 of FIG. 6 has the current sources I1 and I2 removed. Therefore, the FET Q1 is turned off and on directly by the status of the switches SW3 and SW4.

Figure 7:
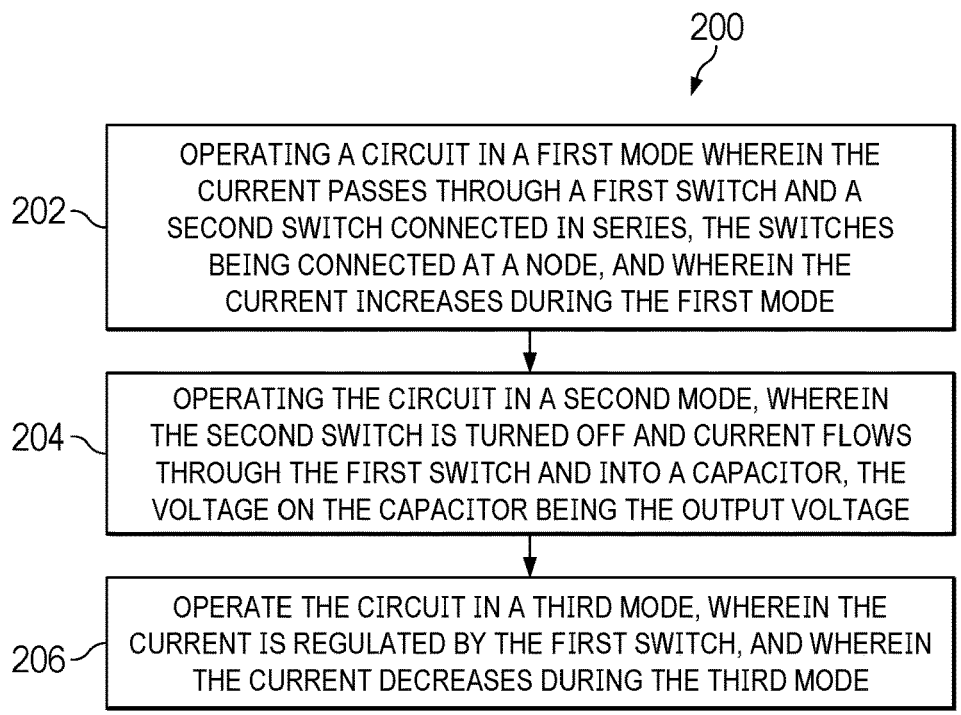
FIG. 7 is a flow chart describing an embodiment of the operation of the circuit of FIG. 1.

The operation of the circuit 10 is summarily described by the flow chart 200 of FIG. 7. The operation commences at step 202 with operating the circuit 10 in the first mode wherein the current $I_D$ passes through the first switch Q1 and the second switch Q2 that are connected in series. The switches Q1, Q2 are connected at a node N1. The current $I_D$ increases during the first mode. The operation continues at step 204 with operating the circuit 10 in the second mode, wherein the second switch Q2 is turned off and current flows through the first switch Q1 and into the capacitor C1. The voltage on the capacitor C1 is the output voltage. The operation continues at step 206 with operating the circuit 10 in a third mode, wherein the current is regulated by the first switch Q1, and wherein the current decreases during the third mode.

While illustrative and presently preferred embodiments of the invention have been described in detail herein, it is to be understood that the inventive concepts may be otherwise variously embodied and employed and that the appended claims are intended to be construed to include such variations except insofar as limited by the prior art.

What is claimed is:

1. A circuit comprising:
 a first transistor having a first gate, a first current terminal, and a second current terminal, the first current terminal coupled to a first power terminal;
 a first switch coupled between the second current terminal and a second power terminal;
 a second transistor having a second gate, a third current terminal, and a fourth current terminal, the third current terminal coupled to the second current terminal, and the fourth current terminal coupled to a third power terminal;
 a second switch coupled between the second power terminal and the first gate; and
 a controller having a control input, a first switch control output, a second switch control output, and a gate control output, the control input coupled to the second power terminal, the first switch control output coupled to the first switch, the second switch control output coupled to the second switch, the gate control output coupled to the second gate, and the controller configured to, after a voltage at the second power terminal equals a threshold voltage:
 open the first and second switches; and
 provide a signal at the gate control output, in which the second transistor is configured to turn on responsive to the signal, and the first transistor is configured to turn off responsive to the signal.

2. The circuit of claim 1, further comprising a flyback transformer, wherein the first power terminal is coupled to a primary side of the flyback transformer, and the third power terminal is a ground terminal.

3. The circuit of claim 1, wherein the signal is a first signal, the controller is configured to:
 at a first time:
 open the first switch and close the second switch; and
 provide a second signal at the gate control output, in which the second transistor is configured to turn on responsive to the second signal;
 at a second time:
 open the second switch;
 responsive to the voltage at the second power terminal being equal to the threshold voltage, close the first switch; and
 provide a third signal at the gate control output, in which the second transistor is configured to turn off responsive to the third signal; and
 at a third time:
 open the first and second switches; and
 provide the first signal at the gate control output.

4. The circuit of claim 1, further comprising a third switch coupled between the first gate and the fourth current terminal, wherein the controller has a third switch control output coupled to the third switch.

5. The circuit of claim 4, wherein the second switch is coupled directly to the second power terminal, and the third switch is coupled directly to the third power terminal.

6. The circuit of claim 4, further comprising:
 a driver having a driver input and a driver output, the driver output coupled to the second gate, and the driver input coupled to the gate control output.

7. The circuit of claim 6, wherein the signal is a first signal, and the controller is configured to:
 at a first time:
 open the first switch and the third switch;
 close the second switch; and
 provide a second signal at the gate control output, in which the second transistor is configured to turn on responsive to the second signal;
 at a second time:
 close the first switch;
 open the second switch and the third switch; and
 provide a third signal at the gate control output, in which the second transistor is configured to turn off responsive to the third signal; and
 at a third time:
 open the first switch and the second switch;
 close the third switch; and provide the first signal at the gate control output.

8. The circuit of claim 4, further comprising a current source coupled between the fourth current terminal and the third switch, wherein a current provided by the current source reflects a target rate of change of a voltage at the first current terminal responsive to the third switch being closed.

9. The circuit of claim 1, further comprising a resistor coupled between the second switch and the first gate, wherein a resistance of the resistor reflects a target rate of change of a voltage at the first current terminal responsive to the second switch being closed.

10. The circuit of claim 1, further comprising a current source coupled between the second power terminal and the second switch, wherein a current provided by the current source reflects a target rate of change of a voltage at the first current terminal responsive to the second switch being closed.

11. A circuit comprising:
a first transistor having a first gate, a first current terminal, and a second current terminal, the first current terminal coupled to a first power terminal;
a diode having an anode and a cathode, the anode coupled to the second current terminal, and the cathode coupled to a second power terminal;
a second transistor having a second gate, a third current terminal, and a fourth current terminal, the third current terminal coupled to the second current terminal, and the fourth current terminal coupled to a third power terminal;
a switch coupled between the first gate and the second power terminal; and
a controller having a control input, a switch control output, and a gate control output, the control input coupled to the second power terminal, the switch control output coupled to the switch, the gate control output coupled to the second gate, and the controller configured to, after a voltage at the second power terminal equals a threshold voltage:
open the switch; and
provide a signal at the gate control output, in which the second transistor is configured to turn on responsive to the signal, and the first transistor is configured to turn off responsive to the signal.

12. The circuit of claim 11, further comprising a flyback transformer, wherein the first power terminal is coupled to a primary side of a flyback transformer, and the third power terminal is a ground terminal.

13. The circuit of claim 11 wherein the switch is coupled directly to the cathode.

14. The circuit of claim 11, wherein the switch is a first switch, the switch control output is a first switch control output, the circuit includes a second switch coupled between the first gate and the fourth current terminal, and the controller has a second switch control output coupled to the second switch.

15. The circuit of claim 11, further comprising a resistor coupled between the switch and the first gate, wherein a resistance of the resistor reflects a target rate of change of a voltage at the first current terminal responsive to the switch being closed.

16. The circuit of claim 11, wherein the signal is a first signal, and the controller is configured to:
at a first time:
close the switch; and
provide a second signal at the gates control output, in which the second transistor is configured to turn on responsive to the second signal; and
at a second time:
open the switch; and
provide a third signal at the gate control output, in which the second transistor is configured to turn off responsive to the third signal.

17. The circuit of claim 16, wherein the switch is a first switch;
wherein the circuit includes a second switch coupled between the first gate and the fourth current terminal; and
wherein the controller has a second switch control output coupled to the second switch and configured to:
at the first time and the second time, open the second switch; and
at a third time:
open the first switch;
close the second switch; and
provide the first signal at the gate control output.

18. The circuit of claim 11, further comprising a resistor coupled between the switch and the first gate, wherein a resistance of the resistor reflects a target rate of change of a voltage at the first current terminal responsive to the switch being closed.

19. The circuit of claim 11, further comprising a current source coupled between the second power terminal and the switch, wherein a current provided by the current source reflects a target rate of change of a voltage at the first current terminal responsive to the switch being closed.

20. A circuit comprising:
a first transistor having a first gate, a first current terminal, and a second current terminal, the first current terminal coupled to a first power terminal, and the second current terminal coupled to a second power terminal;
a switch coupled between the second power terminal and the first gate;
a second transistor having a second gate, a third current terminal, and a fourth current terminal, the third current terminal coupled to the second current terminal, and the fourth current terminal coupled to a third power terminal; and
a controller having a control input, a switch control output, and a gate control output, the control input coupled to the second power terminal, the switch control output coupled to the switch, the gate control output coupled to the second gate, and the controller configured to, after a voltage at the second power terminal equals a threshold voltage:
open the switch; and
provide a signal at the gate control output, in which the second transistor is configured to turn on responsive to the signal, and the first transistor is configured to turn off responsive to the signal.

21. The circuit of claim 20, wherein the switch is coupled directly to the second power terminal.

22. The circuit of claim 20, further comprising a flyback transformer, wherein the first power terminal is coupled to a primary side of a flyback transformer, and the third power terminal is a ground terminal.

23. The circuit of claim 20, wherein the switch is a first switch, and the circuit further comprises a diode or a second switch coupled between the second current terminal and the second power terminal.

24. The circuit of claim 20, wherein the signal is a first signal, and the controller is configured to:
at a first time:
close the switch; and provide a second signal at the gate control output, in which the second transistor is configured to turn on responsive to the second signal; and at a second time:

open the switch; and provide a third signal at the gate control output, in which the second transistor is configured to turn off responsive to the third signal.

25. The circuit of claim 24, wherein the switch is a first switch;

wherein the circuit includes a second switch coupled between the first gate and the fourth current terminal;

wherein the control has a second switch control output coupled to the second switch and configured to:

at the first time and the second time, open the seconder switch;

at a third time:

open the first switch;

close the second switch; and provide the first signal at the gate control output.

26. The circuit of claim 20, further comprising a resistor coupled between the switch and the first gate, wherein a resistance of the resistor reflects a target rate of change of a voltage at the first current terminal responsive to the switch being closed.

27. The circuit of claim 20, further comprising a current source coupled between the second power terminal and the switch, wherein a current provided by the current source reflects a target rate of change of a voltage at the first current terminal responsive to the switch being closed.

* * * * *